(12) United States Patent
Chamberlayne

(10) Patent No.: US 8,573,865 B2
(45) Date of Patent: Nov. 5, 2013

(54) ADAPTER PLATE FOR A CAMERA

(76) Inventor: Andrew Chamberlayne, North Vancouver (CA)

( * ) Notice: Subject to any disclaimer, the term of this patent is extended or adjusted under 35 U.S.C. 154(b) by 0 days.

(21) Appl. No.: 13/359,425

(22) Filed: Jan. 26, 2012

(65) Prior Publication Data

US 2013/0195437 A1 Aug. 1, 2013

(51) Int. Cl.
*G03B 17/00* (2006.01)
*F16M 11/04* (2006.01)

(52) U.S. Cl.
USPC ........................................ 396/419; 248/187.1

(58) Field of Classification Search
USPC .................. 396/420, 419, 422; 248/187.1
See application file for complete search history.

(56) References Cited

U.S. PATENT DOCUMENTS

| D307,286 S  | * | 4/1990  | Ginder ........................ D16/242 |
|-------------|---|---------|----------------------------------|
| 5,612,756 A | * | 3/1997  | Kardach ...................... 396/422 |
| 6,019,326 A | * | 2/2000  | Baerwolf et al. ........... 248/177.1 |
| 6,601,999 B1| * | 8/2003  | McTeer ....................... 396/420 |
| 7,980,771 B2|   | 7/2011  | Chamberlayne |
| 8,075,202 B1|   | 12/2011 | Chamberlayne |
| 2006/0204240 A1| * | 9/2006 | Cameron et al. ............. 396/325 |
| 2008/0240705 A1| * | 10/2008 | Nazarian ..................... 396/420 |
| 2009/0196596 A1|   | 8/2009  | Chamberlayne |
| 2010/0098404 A1| * | 4/2010  | Inoue .......................... 396/422 |
| 2011/0142436 A1| * | 6/2011  | Eynav .......................... 396/420 |
| 2011/0243544 A1|   | 10/2011 | Chamberlayne |

\* cited by examiner

*Primary Examiner* — Christopher Mahoney
(74) *Attorney, Agent, or Firm* — Cameron IP

(57) ABSTRACT

An adapter plate for a camera comprises a first side and a second side opposite to the first side. There are least two threaded apertures extending into the first side of the adapter plate. There is also an opening extending through the adapter plate from the first side of the adapter plate to the second side of the adapter plate.

12 Claims, 10 Drawing Sheets

ADAPTER PLATE FOR A CAMERA

BACKGROUND OF THE INVENTION

1. Field of the Invention

The present invention relates to an adapter plate for coupling a camera to a tripod and, in particular, to an adapter plate which allows a camera to be readily coupled to either a tripod or a device for rotatably mounting a camera on a person.

2. Description of the Related Art

U.S. Pat. No. 7,980,771 which issued to Chamberlayne on Jul. 19, 2011, and the full disclosure of which is incorporated herein by reference, discloses a device for rotatably mounting a camera on a person. The device comprises a female connector and a male connector. The female connector has a U-shaped slot defined by a pocket and a pair of opposed channels which extend from the pocket. The male connector has a plate and a truncated cylindrical body mounted on the plate. The plate is slidably received by the U-shaped slot of the female connector and rotatable through 360 degrees within the pocket of the female connector. The truncated cylindrical body of the male connector is provided with a flat edge and extends from the male connector. The threaded member is for engaging a threaded female tripod receiver of the camera. A strap assembly is connected to the female connector. The strap assembly is for mounting the device to the person. The plate of the male connector has a first rotatable position within the pocket of the female connector in which the male connector is secured to the female connector, and a second rotatable position within the pocket of the female connector in which the male connector is releasable from the female connector. The male connector can only be received or released from the U-shaped slot of the female connector when the flat edge of the truncated cylindrical body of the male connector is aligned with one of the opposed channels of the female connector.

U.S. Pat. No. 8,075,202 issued on Dec. 13, 2011 by Chamberlayne, and the full disclosure of which is incorporated herein by reference, discloses a device for rotatably mounting a camera on a person. The device comprises a female connector and a male connector. The female connector has a U-shaped slot defined by a pocket and a pair of opposed channels which extend from the pocket. The male connector has a wedge-shaped base, a plate spaced-apart from the base, and an opening extending through the wedge-shaped base and the plate. The plate is slidably received by the U-shaped slot of the female connector and is rotatable through 360 degrees within the pocket of the female connector. A threaded member extends through the opening in the male connector. The threaded member is for engaging a threaded tripod receiver of the camera. A strap assembly is connected to the female connector. The strap assembly is for mounting the device on the person. The plate of the male connector has a first rotatable position within the pocket of the female connector in which the male connector is secured to the female connector, and a second rotatable position within the pocket of the female connector in which the male connector is releasable from the female connector. The wedge-shaped base of the male connector has a slope of between 5° and 25° and preferably a slope of 15°. This slope of the wedge-shaped base prevents free cantilevering of the camera. This also reduces stress on both the device and the camera.

Both of the above-mentioned prior art devices require that the threaded member engage the female tripod receiver of the camera in order to couple the male connector to the camera. It is therefore generally not possible to couple the camera to a tripod when the male connector is coupled to the camera

SUMMARY OF THE INVENTION

It is an object of the present invention to provide an improved adapter plate which allows a camera to be readily coupled to either a tripod or a device for rotatably mounting a camera on a person.

There is accordingly provided an adapter plate for a camera comprising a first side and a second side opposite to the first side. There are at least two threaded apertures extending into the first side of the adapter plate. There is also an opening extending through the adapter plate from the first side of the adapter plate to the second side of the adapter plate. The opening is disposed between two of said at least two threaded apertures. The adapter plate may also include lateral channels extending longitudinally between the first side of the adapter plate and the second side of the adapter plate. The opening extending through the adapter plate may be a transversely extending elongate slot. The opening extending through the adapter plate may include a shoulder.

The adapter plate may include a first threaded aperture, a second threaded aperture and a third threaded aperture. The opening may be disposed between the second threaded aperture and the third threaded aperture. There may be a pair of longitudinally extending channels on the first side of the adapter plate. The first threaded aperture and second threaded aperture may be disposed between the longitudinally extending channels. There may be a protrusion extending from the first side of the adapter plate and the third threaded aperture may extend into the protrusion. There may be a pair of longitudinally extending channels on a planar surface of the protrusion. The third threaded aperture may be disposed between the longitudinally extending channels on a planar surface of the protrusion. The protrusion extending from the first side of the adapter plate may be a truncated cylinder. There may be a connector for rotatably mounting a camera on a person mounted on the adapter plate. A threaded member may engage one of the threaded apertures to couple the connector to the adapter plate.

There is also provided a combination comprising a camera having a threaded tripod receiver, a connector for rotatably mounting the camera on a person, and an adapter plate. The adapter plate has a first side and a second side opposite to the first side. There are at least two threaded apertures extending into the first side of the adapter plate. There is also an opening extending through the adapter plate from the first side of the adapter plate to the second side of the adapter plate. A threaded member engages one of said at least two threaded apertures to couple the connector to the adapter plate. Another threaded member extends through the opening in the adapter plate to engage the threaded tripod receiver of the camera to couple the adapter plate to the camera.

The combination may further include a gasket disposed between the connector and the adapter plate. The combination may still further include a gasket disposed between the adapter plate and the camera. The gasket disposed between the adapter plate and the camera may have a protrusion which extends beyond the adapter plate and there may be an opening extending through the protrusion.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
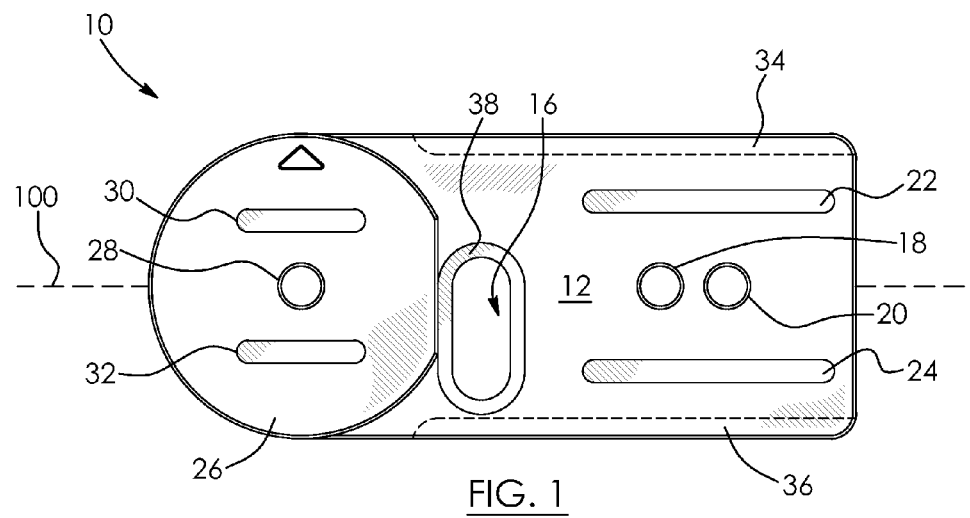
FIG. 1 is a plan view of a first side of an improved adapter plate for a camera.
Figure 2:
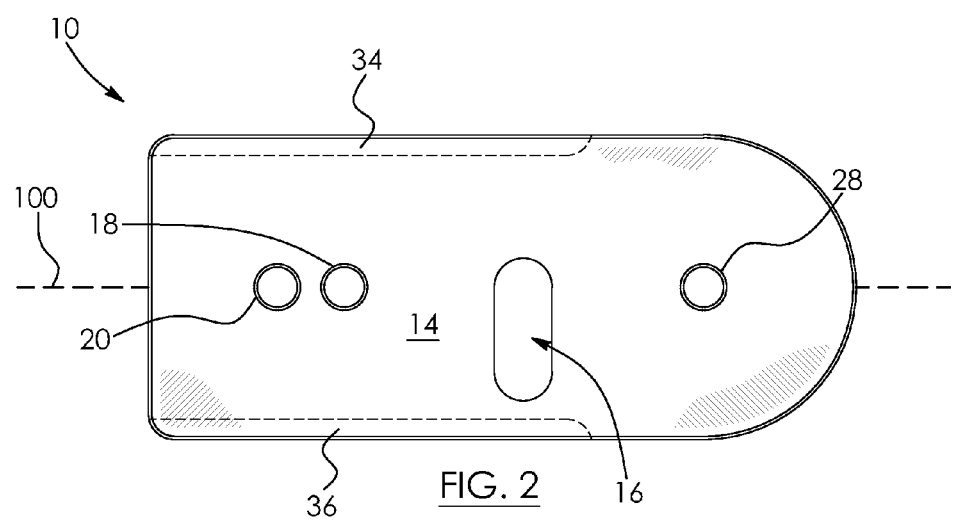
FIG. 2 is a plan view of a second side of the adapter plate, the second side of the adapter plate being opposite to the first side of the adapter plate.

Referring to the drawings and first to FIGS. 1 and 2 an adapter plate 10 is shown. The adapter plate 10 has a first side 12, which is shown in FIG. 1, and a second side 14, which is shown in FIG. 2. There is an opening in the form of an elongate slot 16 extending through the adapter plate 10 from the first side 12 thereof to the second side 14 thereof. In this example the elongate slot 16 is substantially elliptical. In other examples, the adapter plate 10 may be provided with a plurality of smaller, spaced-apart openings instead of an elongate slot. The elongate slot 16 is disposed near a center of the adapter plate 10 and extends transversely across the adapter plate, i.e. perpendicular to a longitudinal axis 100 of the adapter plate. First and second threaded openings in the form of threaded apertures 18 and 20 also extend through the adapter plate 10 from the first side 12 thereof to the second side 14 thereof, although it is not required that the threaded apertures 18 and 20 extend through to the second side 14 of the adapter plate 10. The threaded apertures 18 and 20 are disposed between a pair of parallel channels 22 and 24 which extend along the first side 12 of the adapter plate 10. In this example the first threaded aperture 18 and the second threaded aperture 20 are ¼ inch diameter apertures aligned along the longitudinal axis 100 of the adapter plate 10. The channels 22 and 24 extend parallel to the longitudinal axis 100 of the adapter plate 10.

Figure 3:
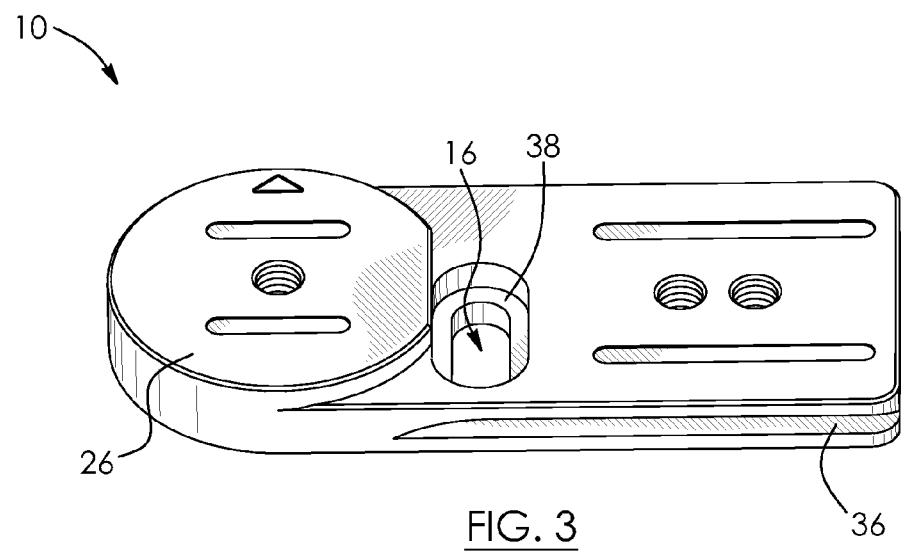
FIG. 3 is a side perspective view of the adapter plate.
Figure 4:
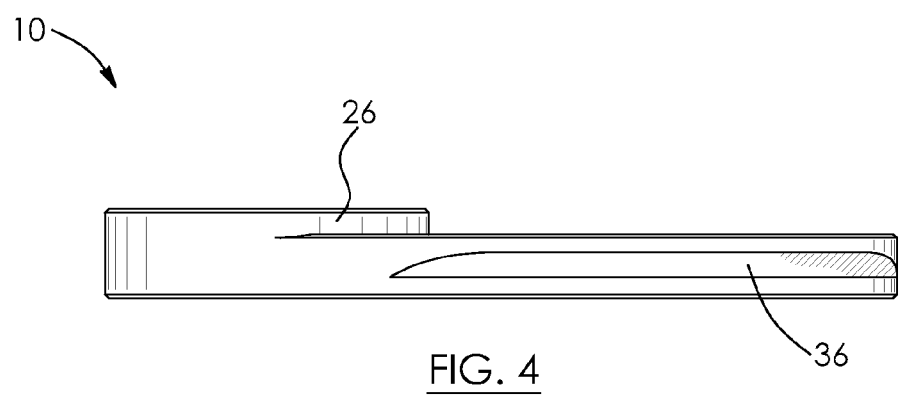
FIG. 4 is a side elevation view of the adapter plate.

There is also a protrusion 26 extending outwardly from the first side 12 of the adapter plate 10. The protrusion 26 is best shown in FIGS. 3 and 4 and, in this example, the protrusion 26 is in the form of a truncated cylinder. Referring back to FIGS. 1 and 2, there is a third threaded opening in the form of threaded aperture 28 which extends through the protrusion 26 to the second side 14 of the adapter plate 10. The third threaded aperture 28 is disposed near a center of the protrusion 26 and between a pair of parallel channels 30 and 32. In this example, the parallel channels 30 and 32 extend parallel to the longitudinal axis 100 of the adapter plate 10. There are lateral channels 34 and 36 extending along opposite sides of the adapter plate 10. The lateral channels 34 and 36 extend parallel to the longitudinal axis 100 of the adapter plate 10.

One of the lateral channels 36 is best shown in FIGS. 3 and 4. A shoulder 38 in the elongate slot 16 is also shown in FIG. 3.

Figure 5:
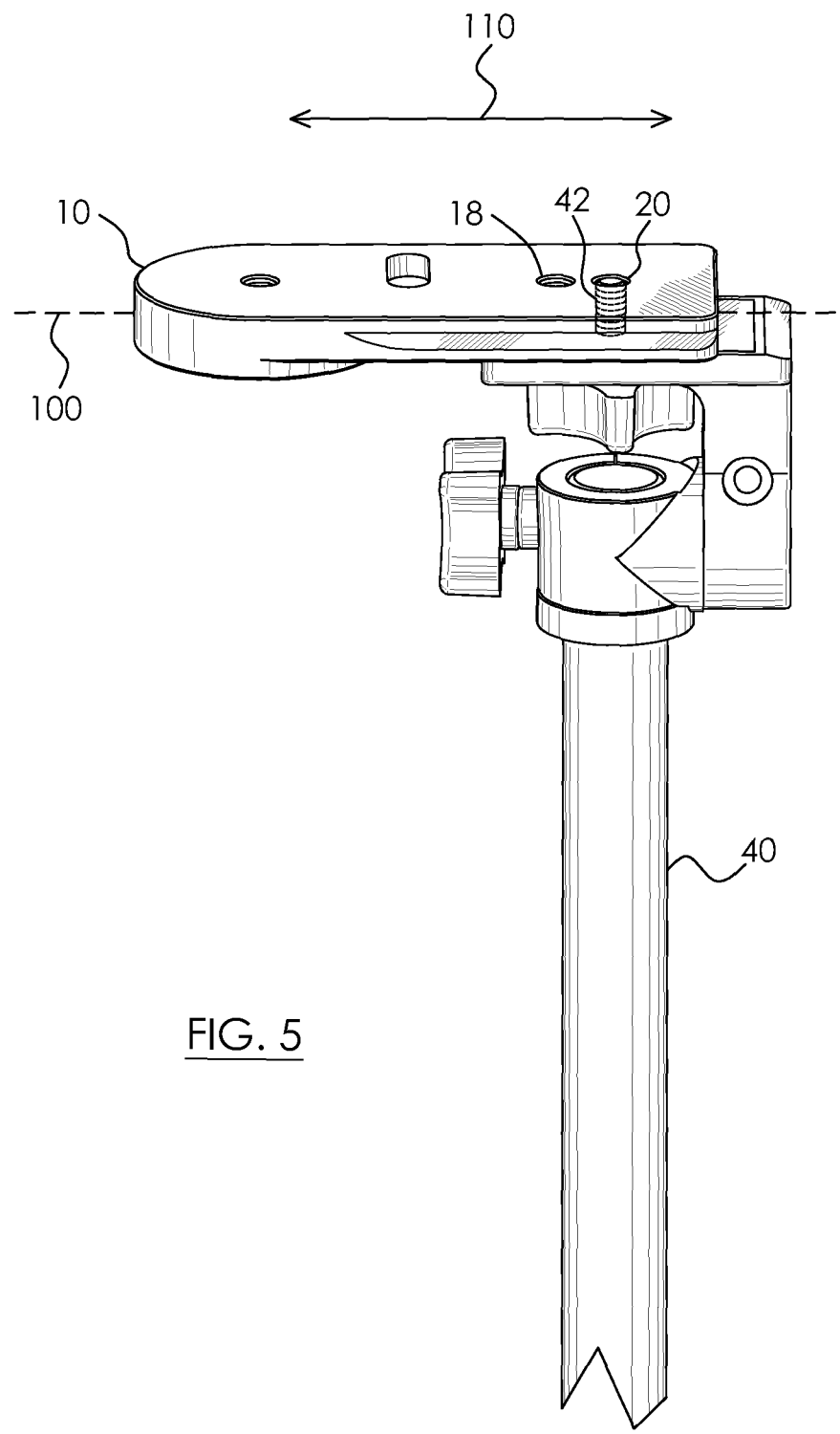
FIG. 5 is a perspective view showing the adapter plate coupled to a tripod.
Figure 6:
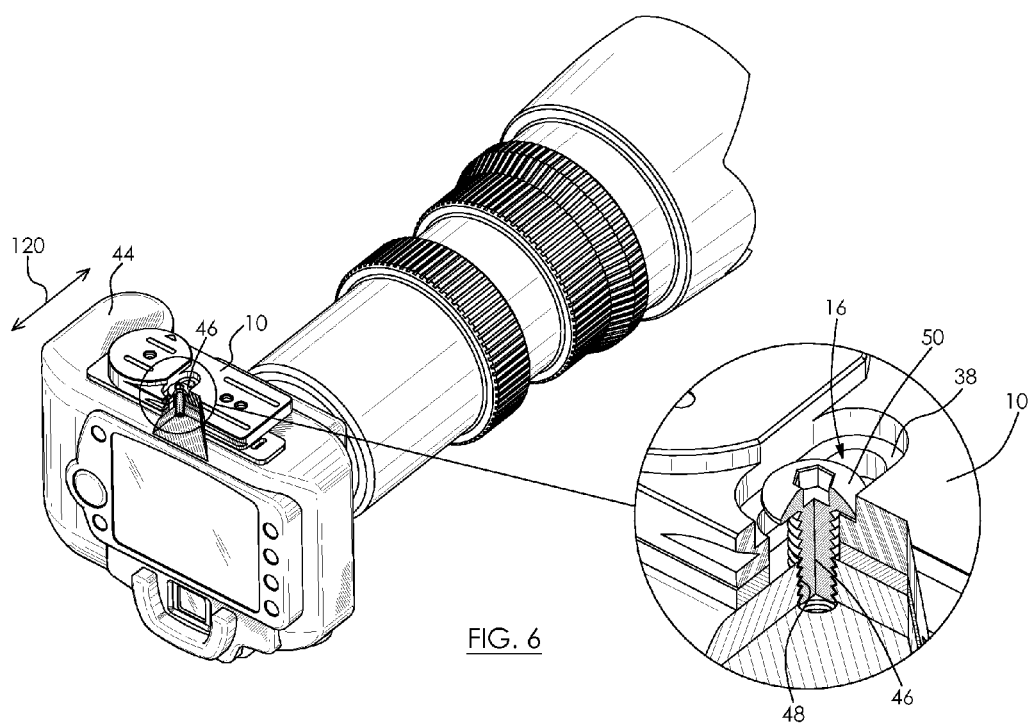
FIG. 6 is a perspective, partially sectional, view showing the adapter plate coupled to a camera.
Figure 9:
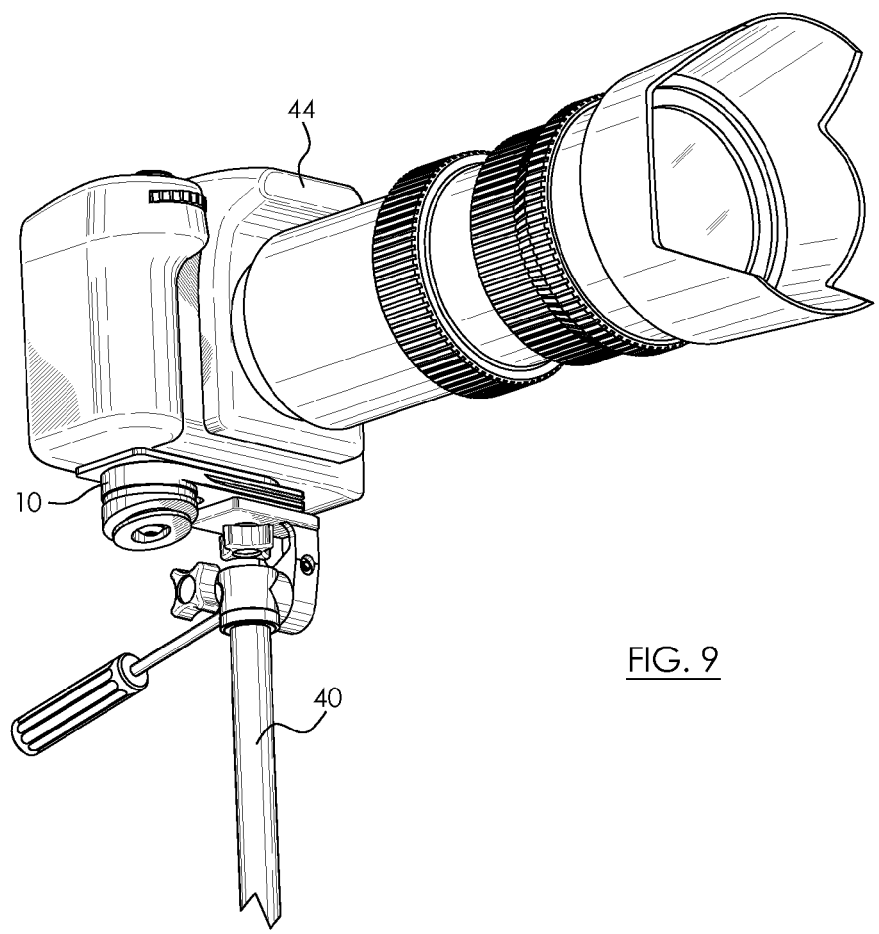
FIG. 9 is a perspective view showing the adapter assembly coupling the camera to the tripod.

The adapter plate 10 may be releasably secured to a tripod 40 as shown in FIG. 5. A threaded member 42 of the tripod 40 may engage either the first threaded aperture 18 or second threaded aperture 20 of the adapter plate 10, thereby securing the adapter plate to the tripod. The adapter plate 10 may also be releasably secured to a camera 44 as shown in FIG. 6. A threaded member in the form of a bolt 46 extends through the elongate slot 16 and engages a threaded tripod receiver 48 of the camera 44, thereby securing the adapter plate to the camera. A head 50 of the bolt member 46 sits on the shoulder 38 of the elongate slot 16. It will be understood by a person skilled in the art that the adapter plate 10 may function to couple the camera 44 to the tripod 40 as shown in FIG. 9.

Referring back to FIGS. 5 and 6, providing multiple threaded apertures (i.e. the first threaded aperture 18 and the second threaded aperture 20) which may be engaged by the threaded member 42 of the tripod 40 allows the position of the adapter plate 10 to be adjusted relative to the tripod 40. In this example, the relative position of the adapter plate 10 may be adjusted in a longitudinal direction relative to the tripod 40 as generally indicated by arrows 110 in FIG. 5. This is because the first and second threaded apertures 18 and 20 are aligned along the longitudinal axis 100 of the adapter plate 10. The transversely extending elongate slot 16 on the adapter plate 10 allows the position of the adapter plate 10 to be adjusted in a transverse direction relative to the camera 44 as generally indicated by arrows 120 in FIG. 6. This is because the position of the threaded member 46, which engages the tripod receiver 48, is adjustable within the elongate slot 16. By allowing the above described relative adjustments the adapter plate 10 facilitates the coupling of various different combinations of cameras and tripods.

Figure 7:
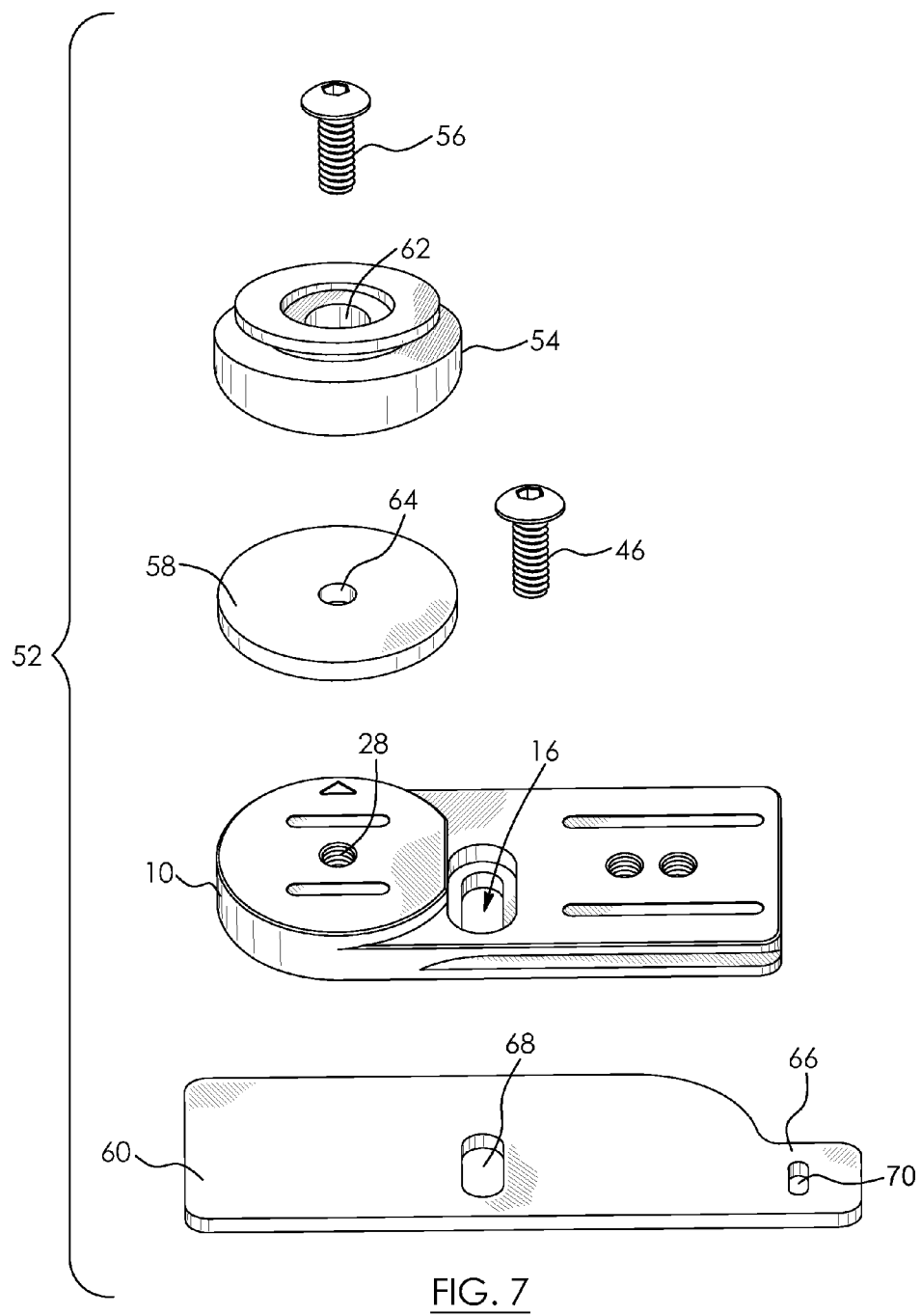
FIG. 7 is an exploded view of an adapter assembly comprising the adapter plate.
Figure 8:
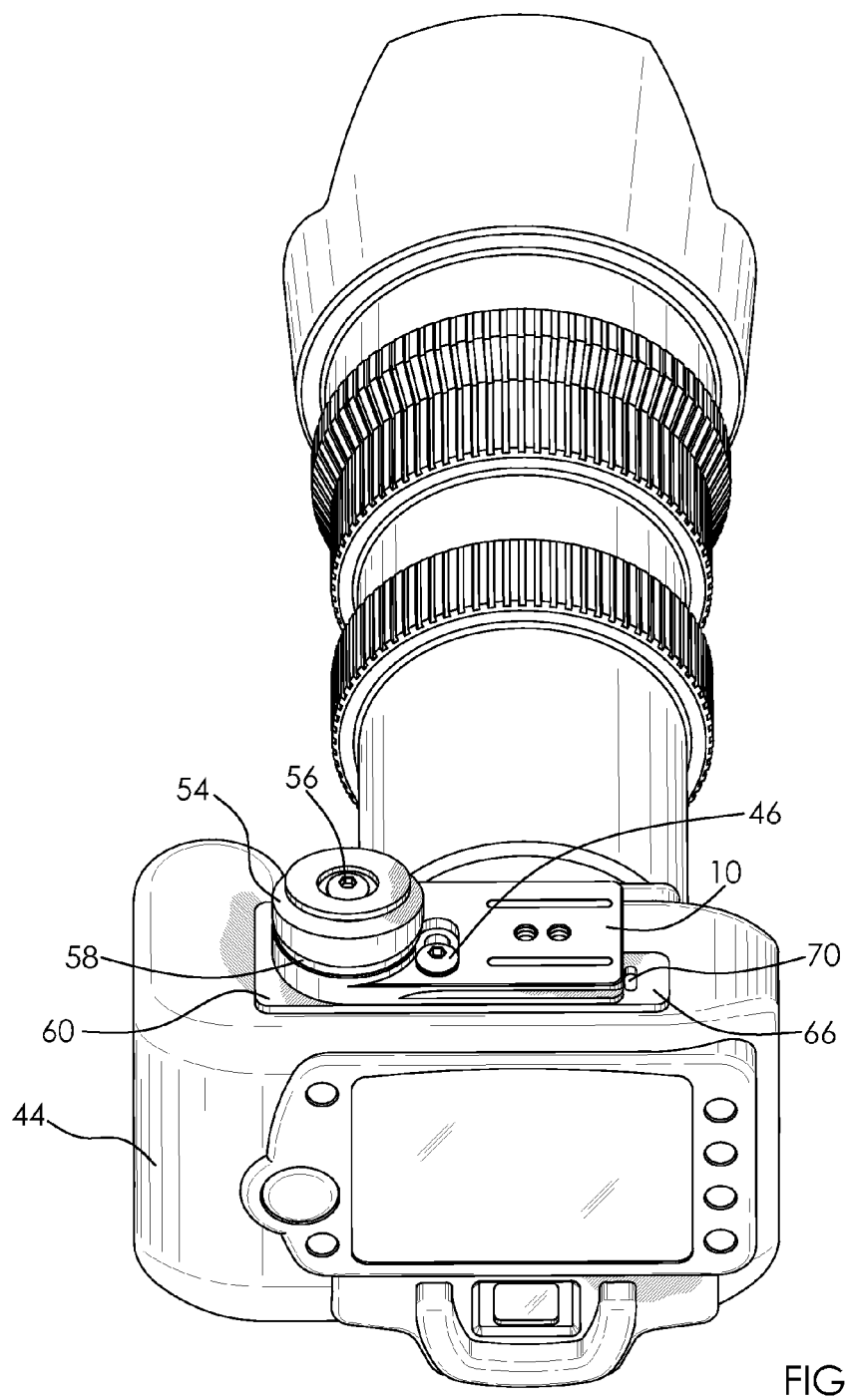
FIG. 8 is a perspective view showing the adapter assembly coupled to the camera.

Referring now to FIGS. 7 and 8, the adapter plate 10 may further be used as part of an adapter assembly 52 including a male connector 54 similar to the type disclosed in U.S. Pat. No. 8,075,202. The adapter assembly 52 comprises the adapter plate 10, the bolt member 46 which secures the adapter plate 10 to the camera 44; the male connector 54; a threaded member in the form of a bolt 56 which secures the male connector 54 to the adapter plate 10; a circular gasket 58 disposed between the adapter plate 10 and the male connector 54; and an elongate gasket 60 disposed between the adapter plate 10 and the camera 44.

The male connector 54 and circular gasket 58 are each provided with respective centrally disposed openings 62 and 64 extending therethrough. The bolt 56 extends through the openings 62 and 64 to engage the third threaded aperture 28 of the adapter plate 10, thereby securing the male connector 54 to the adapter plate. The elongate gasket 60 has a profile generally similar to that of the adapter plate 10 further including a projection 66. There is a first opening 68 in the elongate gasket 60 which is in the form of a substantially elliptical, slot which corresponds to the slot 16 in the adapter plate 10. The bolt 46 extends through the slot 16 in the adapter plate 10 and the opening 68 in the elongate gasket 60 to engage the threaded tripod receiver 48, thereby securing the adapter plate 10 to the camera 44 as shown in FIG. 8. There is also an opening 70 extending through the projection 66 of the elongate gasket 60. The projection 66 extends beyond the adapter plate 10 when the adapter plate 10 is secured to the camera 44. This allows a handle (not shown) or other attachment to engage the opening 70 in the projection 66 and thereby be coupled to the camera 44.

Figure 10:
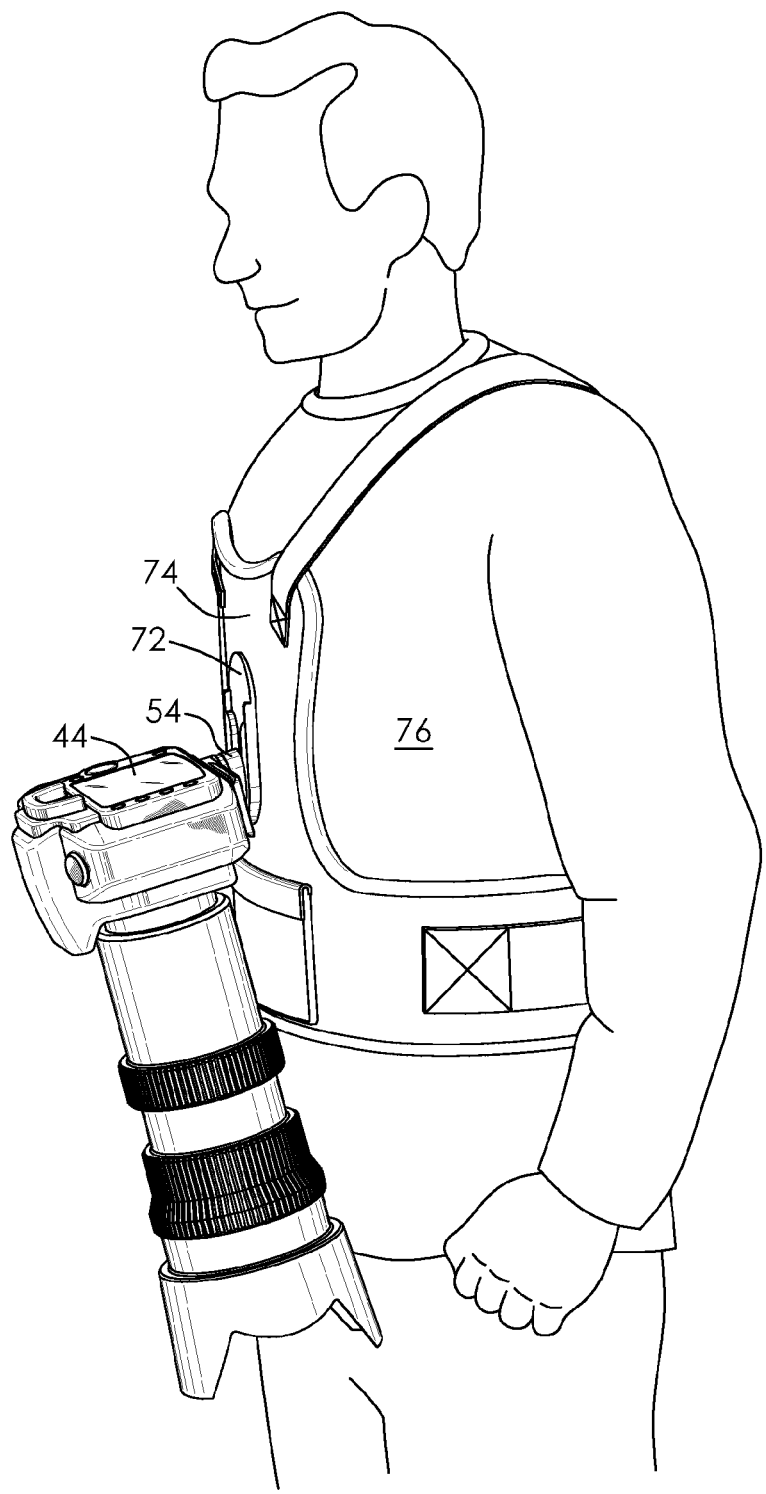
FIG. 10 is a perspective view showing the adapter assembly coupling the camera to a device for rotatably mounting a camera on a person.

The adapter assembly 52 not only allows the camera 44 to be coupled to the tripod 40, as shown in FIG. 9, but also to a device 74 for rotatably mounting a camera on a person 76, as shown in FIG. 10. In FIG. 9, the camera 44 is coupled to the tripod 40 by means of the adapter plate 10 as shown in FIG. 5 and described above. In FIG. 10, the device 74 for rotatably mounting a camera on the person 76 is similar to the type disclosed in U.S. Pat. No. 7,980,771 and U.S. Pat. No. 8,075,202. The device 74 has a female connector 72 in the form of a slotted receptacle. The female connector 72 receives the male connector 54, thereby allowing the camera 44 to be rotatably mounted on a person 76.

Figure 11:
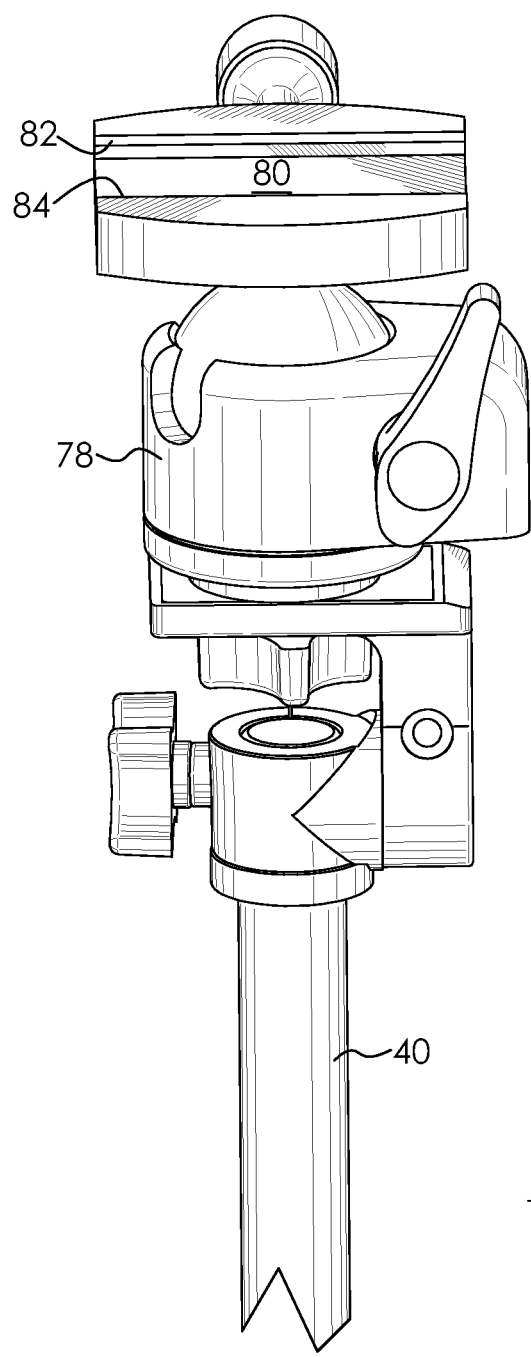
FIG. 11 is a perspective view showing a tripod quick release system coupled to a tripod.
Figure 12:
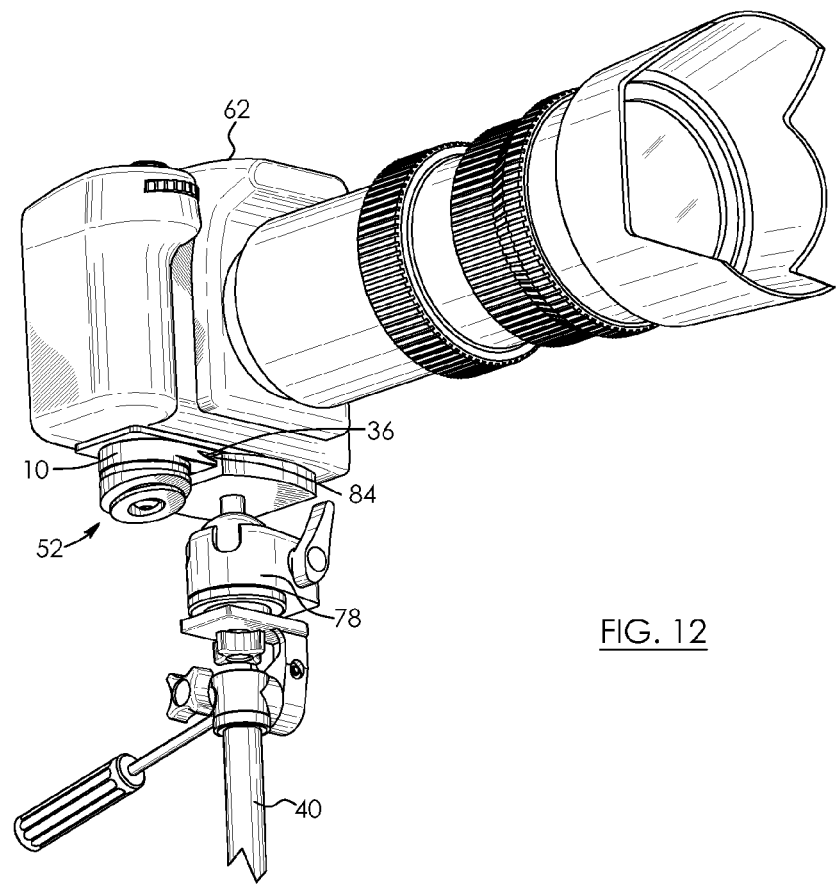
FIG. 12 is a perspective view showing the adapter system coupling the camera to the tripod quick release system of FIG. 11.

The adapter assembly 52 may also be used with a tripod quick release system 78 as shown in FIGS. 11 and 12. In this example, the tripod quick release system 78 is similar to the type offered under the registered trademark Area Swiss®. The tripod quick release system 78, which is best shown in FIG. 11, is mounted on the tripod 40 in a manner well known in the art and has a planar surface 80 between a pair of opposed flanges 82 and 84. The flanges 82 and 84 engage the lateral channels 34 and 36 of the adapter plate 10 as shown in FIG. 12 for one of the flanges 84 and one of the lateral channels 36. This allows the adapter plate 10 of the adapter assembly 52 to be engaged by the tripod quick release system 78, thereby coupling camera 62 to the tripod quick release system 78 mounted on the tripod 40.

The adapter assembly 52 may also be used with another tripod quick release (not shown) similar to the type offered under the registered trademark Manfrotto®. When the adapter plate 10 is used with such a tripod quick release system, a quick release plate (not shown) is threaded into either the first threaded aperture 18 or the second threaded aperture 20 when the adapter plate 10 is secured to the camera 62. The camera 62 may then be coupled to a mating quick release plate (not shown) mounted on the tripod 40.

It will be understood by a person skilled in the art that many of the details provided above are by way of example only, and are not intended to limit the scope of the invention which is to be determined with reference to the following claims.

What is claimed is:

1. An adapter plate for a camera, the adapter plate comprising:
    a first side and a second side opposite to the first side;
    at least two threaded apertures extending into the first side of the adapter plate;
    an opening extending through the adapter plate from the first side of the adapter plate to the second side of the adapter plate, the opening being disposed between two of said at least two threaded apertures; and
    lateral channels extending longitudinally between the first side of the adapter plate and the second side of the adapter plate.

2. The adapter plate as claimed in claim 1 wherein the opening extending through the adapter plate is an elongate slot extending transversely across the adapter plate.

3. The adapter plate as claimed in claim 1 wherein the opening extending through the adapter plate includes a shoulder.

4. The adapter plate as claimed in claim 1 including a first threaded aperture, a second threaded aperture, and a third threaded aperture.

5. The adapter plate as claimed in claim 4 further including a pair of channels on the first side of the adapter plate, the channels extending longitudinally across the adapter plate and the first threaded aperture and second threaded aperture being disposed between the longitudinally extending channels.

6. The adapter plate as claimed in claim 1 further including a connector mounted on the adapter plate, the connector being for rotatably mounting a camera on a person.

7. The adapter plate as claimed in claim 6 wherein a threaded member engages one of said at least two threaded apertures to couple the connector to the adapter plate.

8. An adapter plate for a camera, the adapter plate comprising:
    a first side and a second side opposite to the first side;
    a first threaded aperture, a second threaded aperture, and a third threaded aperture extending into the first side of the adapter plate;
    an opening extending through the adapter plate from the first side of the adapter plate to the second side of the adapter plate, the opening being disposed between two of said three threaded apertures; and
    a protrusion extending from the first side of the adapter plate, and wherein the third threaded aperture extends into the protrusion.

9. The adapter plate as claimed in claim 8 further including a pair of longitudinally extending channels on a planar surface of the protrusion, and wherein the third threaded aperture is disposed between the longitudinally extending channels.

10. The adapter plate as claimed in claim 8 wherein the protrusion extending from the first side of the adapter plate is a truncated cylinder.

11. A combination comprising:
    a camera having a threaded tripod receiver;
    a connector for rotatably mounting the camera on a person;
    an adapter plate having a first side and a second side opposite to the first side, at least two threaded apertures extending into the first side of the adapter plate, and an opening extending through the adapter plate from the first side of the adapter plate to the second side of the adapter plate;
    a threaded member engages one of said at least two threaded apertures to couple the connector to the adapter plate, and another threaded member extends through the opening in the adapter plate to engage the threaded tripod receiver of the camera to thereby couple the adapter plate to the camera; and
    a gasket disposed between the adapter plate and the camera, the gasket having a projection which extends beyond the adapter plate and an opening extending through the projection.

12. The combination as claimed in claim 11 further including a gasket disposed between the connector and the adapter plate.

* * * * *